United States Patent
Fotta et al.

(10) Patent No.: US 8,499,027 B2
(45) Date of Patent: Jul. 30, 2013

(54) SYSTEM AND METHOD FOR EXCHANGING INFORMATION WITH A RELATIONSHIP MANAGEMENT SYSTEM

(75) Inventors: Keith A. Fotta, Duxbury, MA (US); Richard P. Bodrieau, Duxbury, MA (US)

(73) Assignee: Gryphon Networks Corp., Norwood, MA (US)

( * ) Notice: Subject to any disclaimer, the term of this patent is extended or adjusted under 35 U.S.C. 154(b) by 1450 days.

(21) Appl. No.: 10/933,116

(22) Filed: Sep. 2, 2004

(65) Prior Publication Data

US 2006/0045070 A1 Mar. 2, 2006

(51) Int. Cl.
*G06F 15/16* (2006.01)

(52) U.S. Cl.
USPC ............ 709/202; 709/223; 370/401; 455/415

(58) Field of Classification Search
USPC .......... 709/201–203, 223–224; 455/415–417, 455/445, 461–463; 370/351–352, 401
See application file for complete search history.

(56) References Cited

U.S. PATENT DOCUMENTS

| | | | | |
|---|---|---|---|---|
| 5,724,516 A * | 3/1998 | Temoshenko | ................. | 709/202 |
| 5,742,905 A * | 4/1998 | Pepe et al. | ..................... | 455/461 |
| 5,948,054 A * | 9/1999 | Nielsen | .......................... | 709/203 |
| 6,049,782 A | 4/2000 | Gottesman et al. | | |
| 6,092,099 A | 7/2000 | Irie et al. | | |
| 6,611,867 B1 * | 8/2003 | Bowman-Amuah | .......... | 709/224 |
| 6,839,733 B1 * | 1/2005 | Lange et al. | .................. | 709/202 |
| 7,167,899 B2 * | 1/2007 | Lee et al. | ....................... | 709/204 |
| 7,239,629 B1 * | 7/2007 | Olshansky et al. | ........... | 370/401 |
| 7,277,940 B2 * | 10/2007 | Pauly et al. | .................... | 709/223 |
| 7,426,540 B1 * | 9/2008 | Matsumoto et al. | .......... | 709/203 |
| 7,529,230 B2 * | 5/2009 | Lewis et al. | ................... | 370/352 |
| 7,574,471 B2 * | 8/2009 | Fotta et al. | .................... | 709/202 |
| 2001/0047347 A1 * | 11/2001 | Perell et al. | ................... | 709/203 |
| 2003/0041126 A1 | 2/2003 | Buford et al. | | |
| 2003/0074286 A1 | 4/2003 | Rodrigo | | |
| 2003/0131084 A1 | 7/2003 | Pizzorni et al. | | |
| 2003/0172135 A1 | 9/2003 | Bobick et al. | | |
| 2003/0217079 A1 | 11/2003 | Bakalash et al. | | |

FOREIGN PATENT DOCUMENTS

WO  WO 03/107644 A1  12/2003
WO  WO 2006/029030 A3  3/2006

OTHER PUBLICATIONS

International Search Report, PCT/US2005/031435, mailed Feb. 24, 2006.
Notice of Allowability, U.S. Appl. No. 11/071,988, dated May 13, 2009.

* cited by examiner

*Primary Examiner* — Bharat N Barot
(74) *Attorney, Agent, or Firm* — Hamilton, Brook, Smith & Reynolds, P.C.

(57) ABSTRACT

A method and system for exchanging information with a Relationship Management system that includes a connection unit to bridge first and second communications connections and capture information associated with the first and second communications connections. An interface unit is then used to receive communications connection information from the connection unit and deliver select portions of the communications connection information in a select format to the Relationship Management system.

50 Claims, 6 Drawing Sheets

SYSTEM AND METHOD FOR EXCHANGING INFORMATION WITH A RELATIONSHIP MANAGEMENT SYSTEM

BACKGROUND

Almost any business system that even remotely interfaces with a customer may be considered part of a Customer Relationship Management (CRM) system. CRM systems, however, typically focus on but not limited to four main areas: 1) Sales, 2) Customer Service and Support, 3) Marketing Automation, and 4) Collections Management.

The sales component, or Sales Force Automation (SFA) system, usually provides support for retail sales, field sales, call-center sales, and E-commerce. The support may include the collection or distribution of sales information from and to brokers, distributors, and agents. The Customer Service and Support component provides service technician contacts, call-center interactions, and Internet-based contacts with customers. Marketing Automation involves analyzing and automating marketing processes that ultimately impact customer relations. For example, a campaign management system may be used to design marketing campaigns and then track the impact of the campaign on certain groups or types of customers.

Traditionally, CRM systems have been premises-based systems requiring a business to outlay considerable capital to implement and maintain. Recently, with the advent of the Internet, Hosted CRM applications that reside on remote Internet-connected servers have emerged that allow businesses to implement CRM on an on-demand basis. Such Hosted CRM systems have reduced the cost associated with implementing CRM by eliminating the significant capital outlay required by a business while only charging for the services used by a business client of the hosted CRM.

The effectiveness of a CRM system is dependent on the system's ability to collect, maintain, and disseminate important customer information from, for, and to various entities of a business. A particularly challenging issue involves maintaining relevant and up-to-date information for agents using a Sales Force Automation system.

SUMMARY

Because it is critically important to prevent customer relevant information from becoming stale, a CRM system, whether premises-based or hosted, must have an effective and convenient mechanism for collecting and distributing important customer information. Unfortunately, existing CRM systems require sales agents to input customer data into the CRM system using remote interfaces, usually after one or more contacts are made with customers or potential customers. Agents often find it inconvenient or impractical to collect information about contacts over a period of time and then enter such information sporadically using a personal computer (PC), wireless device, or personal digital assistant (PDA). After a period of time, an agent's enthusiasm and diligence in updating the CRM system often diminishes to the point where the agent no longer updates the system, resulting in stale and compromised data within the CRM system. Furthermore, unscrupulous agents may withhold certain contact information from the system to protect their personal customer base.

The present invention provides certain improvements and advantages by automatically and conveniently capturing agent and contact information derived from the communications connection between an agent and contact and exchanging the information with a CRM system. The principles of the present invention can be applied to any Relationship Management (RM) system, including CRM systems for businesses in a commercial environment.

In one embodiment, the present invention provides a method and system for exchanging information with a RM system. The system may include a connection unit that bridges first and second communications connections and captures information associated with the first and second communications connections. The communications connections may be circuit-switched such as standard voice telecommunications calls or packet-switched such as Internet Protocol(IP) or Voice-over-IP (VoIP) traffic. Electronic mail (e-mail), instant messaging, short message service (SMS), or multimedia messaging service (MMS) traffic exchanged between an origin and destination may also be considered as examples of a communications connection. Bridging may be considered the process of linking at least two independent connections to form one connection shared by all of the original connections.

The first communications connection may be with an origin associated with a client agent. The connection unit may verify the identity of the agent to ensure proper tracking of the agent's activities. The second communications connection may be with a destination associated with a contact.

An interface unit receives communications connection information from the connection unit and delivers select portions of the communications connection information in a select format to a RM system. The origin and destination may be any type of communications device such as a telephone, cellular telephone, personal digital assistance, pager, computer, client interface, remote computer terminal, and the like. The connection unit may be a telecommunications switch, an Interactive Voice Response application, a predictive dialer server, a distributed predictive dialer system, an electronic mail server, an Instant Messaging server, a Session Initiated Protocol (SIP) server, and a Multimedia Messaging server.

The captured communications connection information may includes any one or combination of an origin identifier, destination identifier, agent identifier, contact identifier, agent name, agent address, contact name, contact address, at least one agent command, at least one contact command, and contact status. The commands may be user-inputted such as dialed digits, pointer clicks of a computer mouse, or voice commands. To capture the dialed digits, the connection unit may use a dual-tone-multi-frequency (DTMF) detector. The identifier may be a device address such as a telephone number, IP address, or electronic mail address. Otherwise, the identifier may be the agent's name, a username, or identification number.

Portions of the captured information may be selected for delivery to the RM system based on client-specific preferences. Furthermore, the connection unit may capture the communications information before the communications are established with the destination, during established communications with the destination, or after communications have ended with the destination. The interface unit may format the communications connection information into a data string message before delivery to a RM system.

When delivering a network message to the RM, the interface unit may access a web queue service using Hypertext Transfer Protocol (HTTP) with eXtensible Markup Language (XML) data elements to schedule the message delivery over an IP network. Also, the RM may access and use a listener unit to receive the message. The listener unit preferably monitors an IP network and captures communications connection information sent directly or indirectly from the connection unit. Once a message is captured, the listener unit may further convert the communications connection information into a format required by its associated RM system.

An interface unit may support and deliver select communications connection information to multiple RM systems such that the delivered communications information is selected to satisfy the requirements of each RM system. Furthermore, each RM may be associated with a distinct client with distinct requirements, or a group of clients each with distinct requirements found in 3rd party call centers. Regardless of whether the RM system is a premises-based or remotely hosted, the RM system may have one or more remote interfaces that enable one or more members of a client's organization to view or modify select information within the RM system. An origin used to facilitate communications between an agent and contact may also include a remote interface to the RM system.

An agent may be a sales agent, customer service representative, marketing agent, public service representative, or some other member of a client's organization. A contact may be a prospective customer, a customer, an entity related to the client, an entity to which the client has an obligation, or any person that the agent contacts.

The interface unit may query an identifier reverse look-up table or other networked systems to retrieve name, address or any other relevant information, which can be configured on a client-by-client basis associated with the identity of a communications device. Also, the interface unit may receive information from a RM system to configure the interface unit and any other system connected to the interface unit. The information derived from the communications connection is preferably delivered in real-time or near real-time to the RM system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
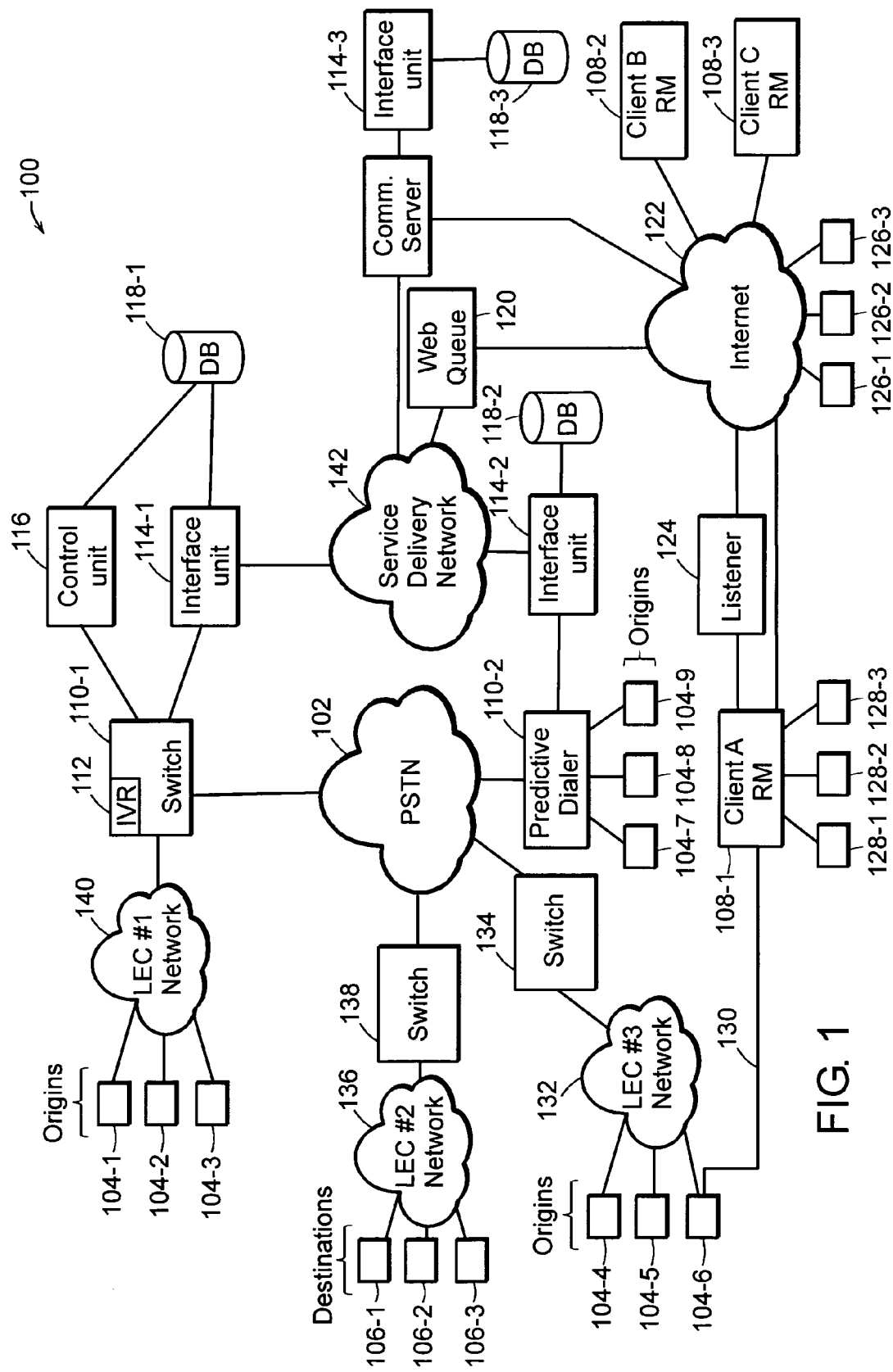
FIG. 1 is a schematic diagram showing a system for exchanging information from a telecommunications switch and predictive dialer with a relationship management system in accordance with principals of the present invention.

One embodiment of the present invention is a system for exchanging information with a relationship management (RM) system. FIG. 1 shows an example of a RM information exchange system 100 interconnected with telecommunications network 102, i.e., the Public Switched Telecommunications Network (PSTN), that illustrates principles of the present invention. It is understood, however, that the present invention applies to any communications system and, more particularly, to exchanging information with an RM 108 that is derived from a communications connection between an origin 104 and destination 106 therein.

A RM in a commercial environment may be a CRM that handles interactions between agents of a commercial business and prospective or current customers. One component of the CRM system is typically the SFA system that enables efficient management of the sales force of a business by maintaining records of customer contacts to enhance sales force productivity. A premises-based CRM may be an application residing within a computer system such as, for example, a SUN Fire server or the like, or within a cluster of computer servers or multiple computer servers distributed throughout an enterprise network. A hosted CRM may reside remotely within a CRM vendor's computer network, but be connected to computers, workstations, and interfaces of a client business via the Internet or some other data network. A hosted CRM can be a software application residing within a computer server, for example, a SUN Fire or Netra-family server or the like, or multiple computer servers configured such as a web interface to act as a single computer. The size of the CRM hardware platform is typically dependent on the capacity needs of the CRM which is not particularly relevant to the principals of this invention.

Typical premises-based CRM products include the E.Piphany E.6 CRM using the Java 2 software platform, Enterprise Edition (J2EE), the Remedy CRM product set, and the Onyx Enterprise CRM. Typical hosted CRM solutions include Software.com's CRM services and Siebal's CRM OnDemand services.

Before exchanging information with an RM 108 such as RM 108-1, connection unit 110-1, a telecommunications switch using Interactive Voice Response (IVR) 112, establishes a first communications connection with an origin 104 such as origin 104-1. The first communications connection with origin 104-1 within local exchange carrier (LEC) network 140 is typically initiated by and associated with a client agent whose identity may be verified by connection unit 110-1. An agent may be a sales, customer service, marketing, or public service representative, or simply a member of a client's organization. The identity may preferably be verified by confirming a passcode or password entered by an agent in response to a prompt when the first communications connection is established. Other forms of verification and authentication may be employed. IVR 112 typically provides the prompting of an agent and the detection of responses from an agent that may be in the form of, for example, dual-tone-multiple-frequency (DTMF) tones generated by origin 104-1 as the agent presses keys on the keypad or keyboard of origin 104-1. If the agent fails to enter the proper password after a number of attempts, the first communications connection may be disconnected.

Connection unit 110-1 may also forward the agent password and other information to interface unit 114-1 or control unit 116, either of which may query database 118-1 to check the agent password. Interface unit 114 may be a software application residing within a hardware platform such as a SUN Fire server or the like. In certain embodiments, interface unit 114 may also function as a control unit 116. Furthermore, either interface unit 114-1 or control unit 116 may remotely access a centrally-located database 118 such as database 118-3 via an internal or private or virtual private network 142. In addition to password information, database 118 may contain a reverse lookup table that associates device identifier information with a particular contact person or business. Thus, interface unit 114 may be capable of querying an identifier reverse look-up table in database 118 or through the service delivery network 142 to retrieve name, address or any other relevant information associated with the identity of a communications device.

After successful verification of the agent identity, connection unit 110-1 may then establish a second communications connection with a destination 106 such as destination 106-3. The second communications connection with destination 106-3 is typically associated with a contact. A contact may be any one or combination of a prospective customer, existing customer, entity related to the client, entity to which the client has an obligation, or other person. Once the first and second communications connections are established, connection unit 110-1 then bridges the first and second communications connections to effectively establish a communications connection between origin 104-1 and destination 106-3.

At any time before, during, or after the first and second communications connections are bridged together, connection unit 110-1 may capture information associated with the first and second communications connections. Once captured, interface unit 114-1 receives the communications connection information from connection unit 110-1 and delivers select portions of the communications connection information in a select format to a RM 108 such as RM 108-1 over an IP based network utilizing some messaged based protocol.

Figure 2:
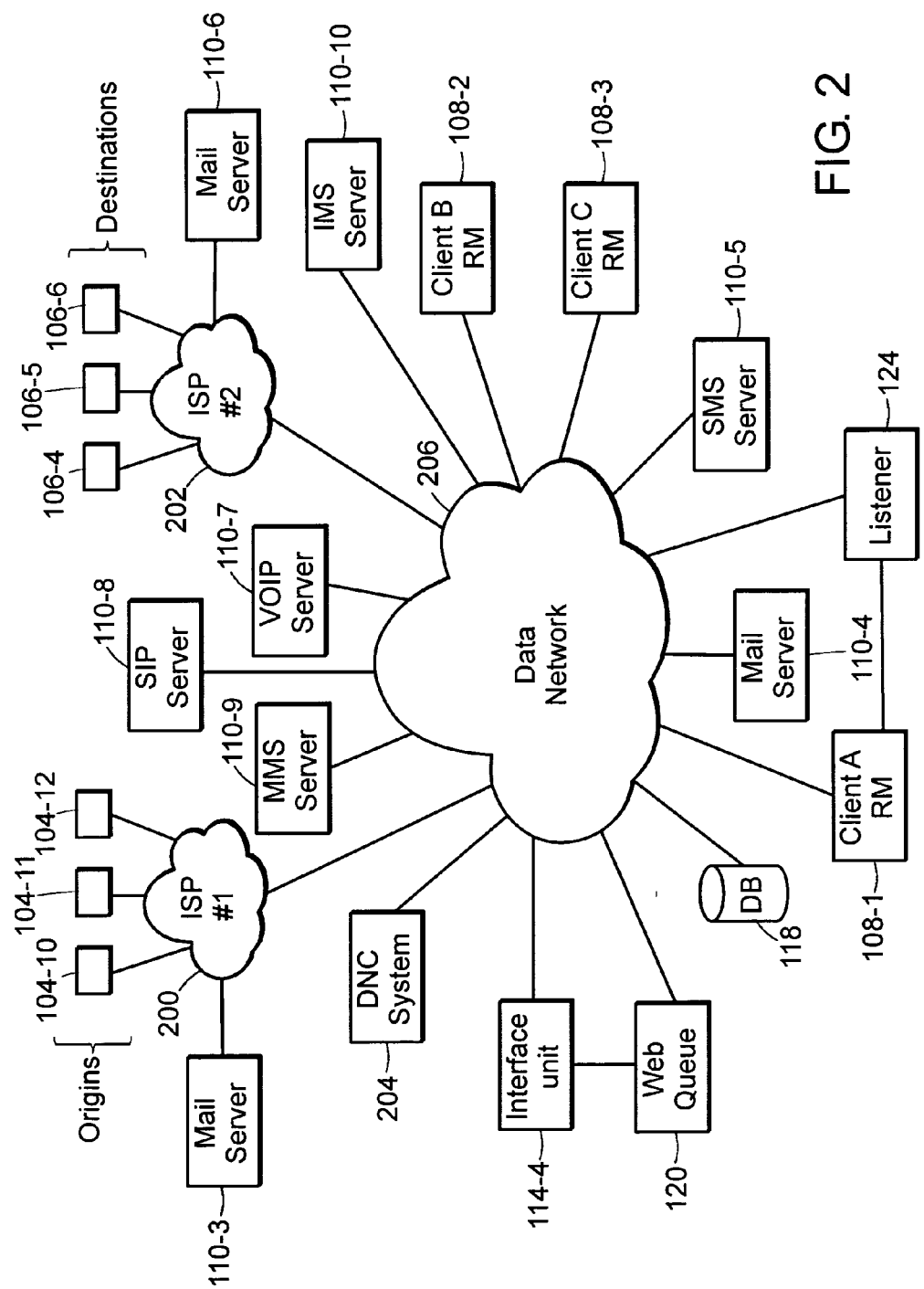
FIG. 2 is a schematic diagram showing a system for exchanging information from multiple connection units connected to a data network with a relationship management system.

The origin 104 and destination 106 are typically communications devices such as telephones, cellular telephones, personal digital assistances, pagers, computers, server client interfaces, or remote computer terminals. As shown in FIGS. 1 and 2, connection unit 110 may be any one of a telecommunications switch 110-1, an Interactive Voice Response (IVR) application 112 within a telecommunications switch 110-1, a predictive dialer server 110-2, a distributed predictive dialer system, an electronic mail server 110-3 or 110-4, an Instant Messaging server (IMS) 110-10, a Session Initiated Protocol (SIP) server 110-8, a Short Message server (SMS) 110-5, a Multimedia Messaging server (MMS) 110-9, or a VoIP server 110-7.

The captured communications connection information may include any one or combination of an origin identifier, destination identifier, agent identifier, contact identifier, agent name, agent address, contact name, contact address, at least one agent command, at least one contact command, contact status, contact duration, communication control data, or electronic mail header and content data. When the connection unit 110 is an electronic mail server such as connection unit 110-3 of FIG. 2, certain information may be captured from the header or contents of an electronic mail message sent from origin 104-10, an electronic mail client within Internet Service Provider (ISP) network 200. Connection unit 110-3 may alternatively forward certain agent electronic mail messages to another connection unit 110-4 where message information may be captured before the electronic mail message is forwarded to, for example, another connection unit 110-6, from which destination 106-4, an electronic mail client of a contact using ISP network 202, eventually retrieves the electronic mail message. Identification, control, and content information may be captured from other types of electronic messages such as SMS messages by connection unit 110-5, MMS messages by connection unit 110-9, SIP messages by connection unit 110-8, and VoIP messages and communications by connection unit 110-7.

After certain information is captured, a portion of the captured information may be selected to be delivered to RM 108-1 based on client-specific preferences. The captured commands may be any one of or combination of dialed digits, pointer clicks, and voice commands. As stated previously, connection unit 110-1 may include IVR 112 which typically uses a DTMF detector to captures dialed digits from an origin 104. Connection unit 110-2 may also have the ability the capture dialed digits from an origin 104-7 using a DTMF detector.

For example, an agent may enter specific commands such as "#9" after a call to a prospective customer contact is completed to indicate that the contact's status has changed from "prospective customer" to "existing customer." Other explicit commands may be entered at any time after establishing the communications connection between origin 104 and connection unit 110 until the connection is disconnected. In certain embodiments, connection unit 110 may capture explicit commands from the contact using a destination 106.

The identifier is usually a device address including any one or combination of a telephone number, Internet Protocol (IP) address, or an electronic mail address. The identifier, however, may also be any one or combination of a name, a username, and identification number. Depending on the requirements of a particular RM 108 and the medium of communications between the RM 108 and interface unit 114, interface unit 114 may configure the captured communications connection information into various formats during delivery to an RM 108.

Figure 3:
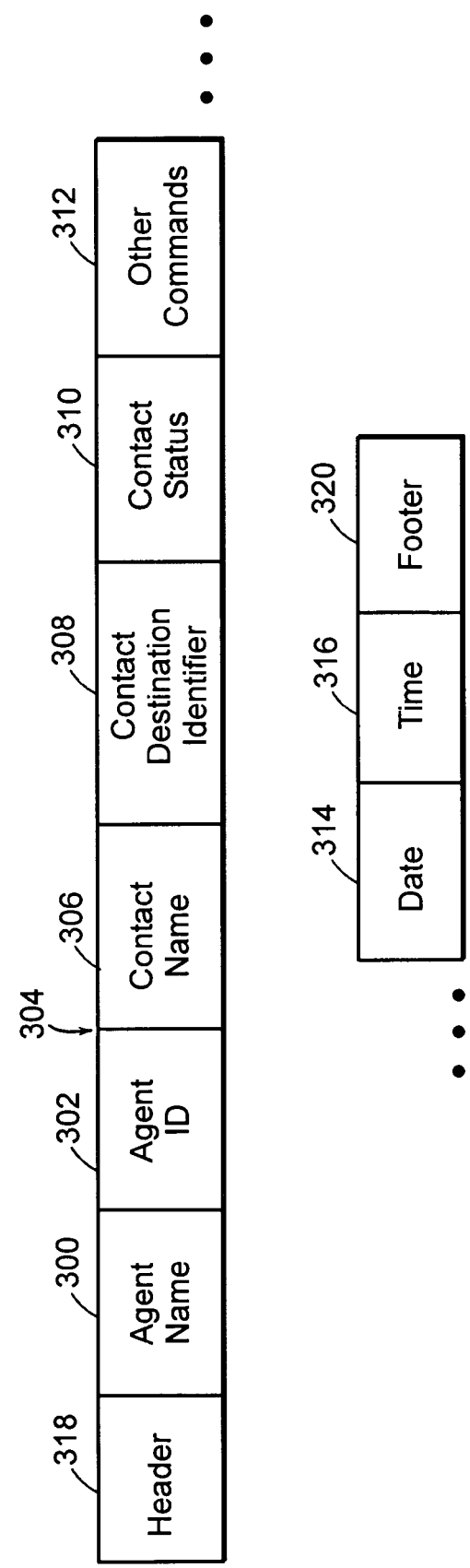
FIG. 3 is a exemplary diagram of a data string of information.

For example, as shown in FIG. 3, interface unit 114 may format the captured information into a data string message for delivery to RM 108. The data string may contain information such as, but not limited to, the client agent's name 300, the agent's identification number (ID) 302, the contact's name 306 which may have been automatically derived from a reverse look-up using the dialed digits from database 118-1, the contact's destination identifier 308 which may be destination telephone number, the contact's status 310 such as "existing customer", and other commands 312 which could be retrieved by the service delivery network 142 associated from either the agent or contact during the communications connection, the date 314, and the time 316. The type and amount of data within a string is may vary depending on a particular client's requirements.

The data may be in binary, binary-coded-decimal (BCD), ASCII form, structured XML, or some other standard or proprietary format. To enable a receiver of the data string such as listener 124 or RM 108 to separate the various data elements of the data string, a delimiter may be inserted between each element. For instance, a delimiter such as a "space" or "|" (i.e., "pipe") may be inserted between agent ID 302 and contact name 306 at location 304 within the data string to enable a receiver to know where agent ID 302 ends and contact name 306 begins. Each data string may also include a header 318 and footer 320 to enable the receiver to distinguish one data string from another. Furthermore, one or more data strings may also be encapsulated in an IP packet for delivery over network 122 to RM 108. String data may also be formatted using HTTP and XML for delivery to web based or hosted RM systems.

Interface unit 114 may deliver select communications information in a network message directly to an RM 108. Alternatively, interface unit 114 may access a web queue service unit 120 to schedule the message delivery over an IP network 122 such as the Internet. Interface unit 114 may be a computer system or a software application residing within a computer workstation or server such as a SUN UltraSparc workstation, or SUN fire server, or Netra-family server, or the like.

An RM 108, such as RM 108-1 may use listener unit 124 to receive the message. Listener unit 124 typically monitors IP network 122 and captures communications connection information sent directly, or indirectly via web queue service unit 120, from connection unit 114-1. Listener unit 124 may then convert the communications connection information into a format required by RM 108-1. Listener unit 124 may also perform other functions including acting as a firewall to protect RM 108-1 from electronic intrusions or hacking. Listener unit 124 may be a computer system or a software application residing within a computer workstation or server such as a SUN UltraSparc workstation, or SUN fire server, or Netra-family server, or the like.

As show in FIGS. 1 and 2, interface unit 110 is typically capable of delivering select communications connection information to multiple RMs 108 including RM 108-1 of client A, RM 108-2 of client B, and RM 108-3 of client C. However, the delivered communications information may be different for each client to satisfy the information gathering requirements for each RM 108 of each distinct client. The RM 108 may be either a premise-based RM that resides within the clients premises or a remotely hosted RM operated by a third party vendor, providing RM services on an on-demand basis.

The RM 108 may have one or more remote interfaces 126 that enable one or more members of a client's organization to view or modify select information within the RM 108. The RM 108 such as RM 108-1 may also have one or more premise-based terminals 128 that also enable client member access to RM 108-1. It also may be possible for an origin 104 such as origin 104-6 to include a remote interface to RM 108-1 via connection 130. Although not shown in FIG. 1, connection 130 may be a virtual connection through any common medium such as the PSTN, Internet, wireless network or a combination the media. For example, an agent may have a cellular telephone that initiates a call to a contact. The cellular telephone may also support packet data networking and a web browser or RM 108-1 remote interface that enables the agent to view the collected contact information within RM 108-1.

Because the information derived from the communications connection may be delivered in real-time or near real-time to the RM 108-1, the agent may actually monitor the update of contact information within RM 108-1 during the call to that customer contact. It may also be possible for an agent to input information or orders into RM 108-1 which could be used by RM 108-1 to configure certain features of an interface unit 114 and any other system connected to an interface unit 114 such as database 118 or a Do-Not-Call (DNC) system 204.

Referring again to FIG. 1, it is important to note that embodiments of the present invention enable an agent to use any origin 104, regardless of the origin 104 geographic location, to establish a connection with connection unit 110-1 and IVR 112 which allows the present system to automatically and conveniently maintain up-to-date contact and other information within RM 108. For example, IVR 112 may be accessed by an origin 104 such as origin 104-4 using a "1-800" telephone number. Thus, even though origin 104-4 is located in a remote LEC network 132 using telecommunications switch 134, origin 104-4 establishes a communications connection with connection unit 110-1 and IVR 112, enabling the RM information exchange system 100 to capture information from that connection and update the RM system automatically.

It should also be obvious to one of skill in the art that a communications device may function as either an origin 104 or destination 106. Thus, for example, an agent may even use destination 106-1 within LEC network 136 having telecommunications switch 138 to establish a first communications connection with connection unit 110-1 and R 112.

Referring to FIG. 2, Data Network 206 acts as the interconnection medium between the various communications elements. Data Network 206 may include portions of a local area network, private network 142, an IP network 122 such as the Internet, PSTN 102, and any other communications medium that facilitates communications between the various elements. As shown in FIG. 2, interface unit 114-4 need not have a dedicated connection to connection unit 110. In other words, connection unit 110 may send captured information to interface unit 114 regardless of the network or geographic location of interface unit 114.

Thus, connection unit 110-3, an e-mail server located on the premises of a client, may send electronic mail information associated with an electronic mail message from an origin 104-10 to a remote interface unit 114-4 which would then send it on to destination 106-4. Interface unit 114-4 may only extract the source and destination e-mail address from the e-mail or may be configured to extract certain content and header data based on that particular client's requirements and send that information to RM 108-1.

Figure 4:
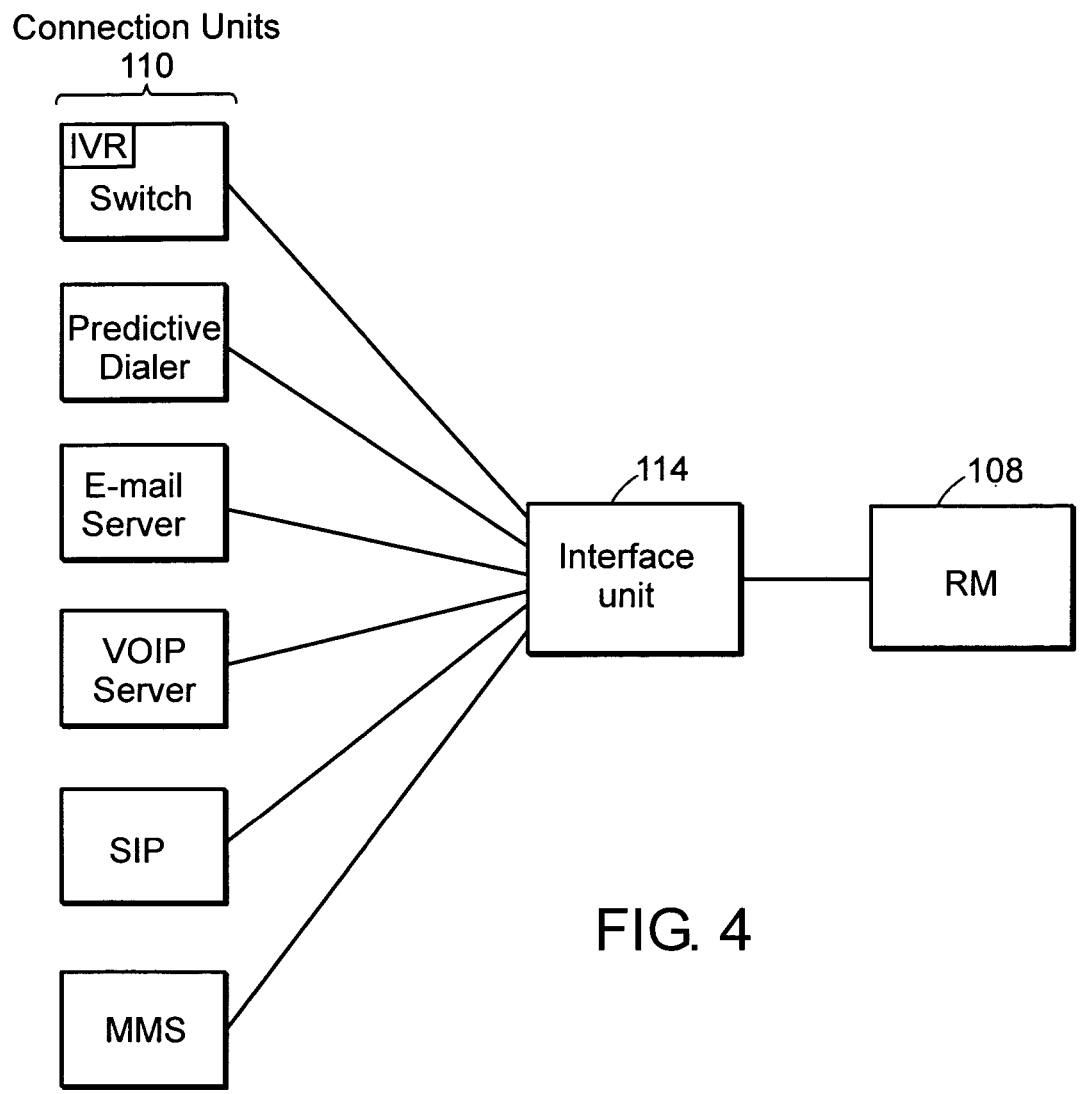
FIG. 4 is a block diagram of an interface unit interfacing with multiple types of connection units.
Figure 5:
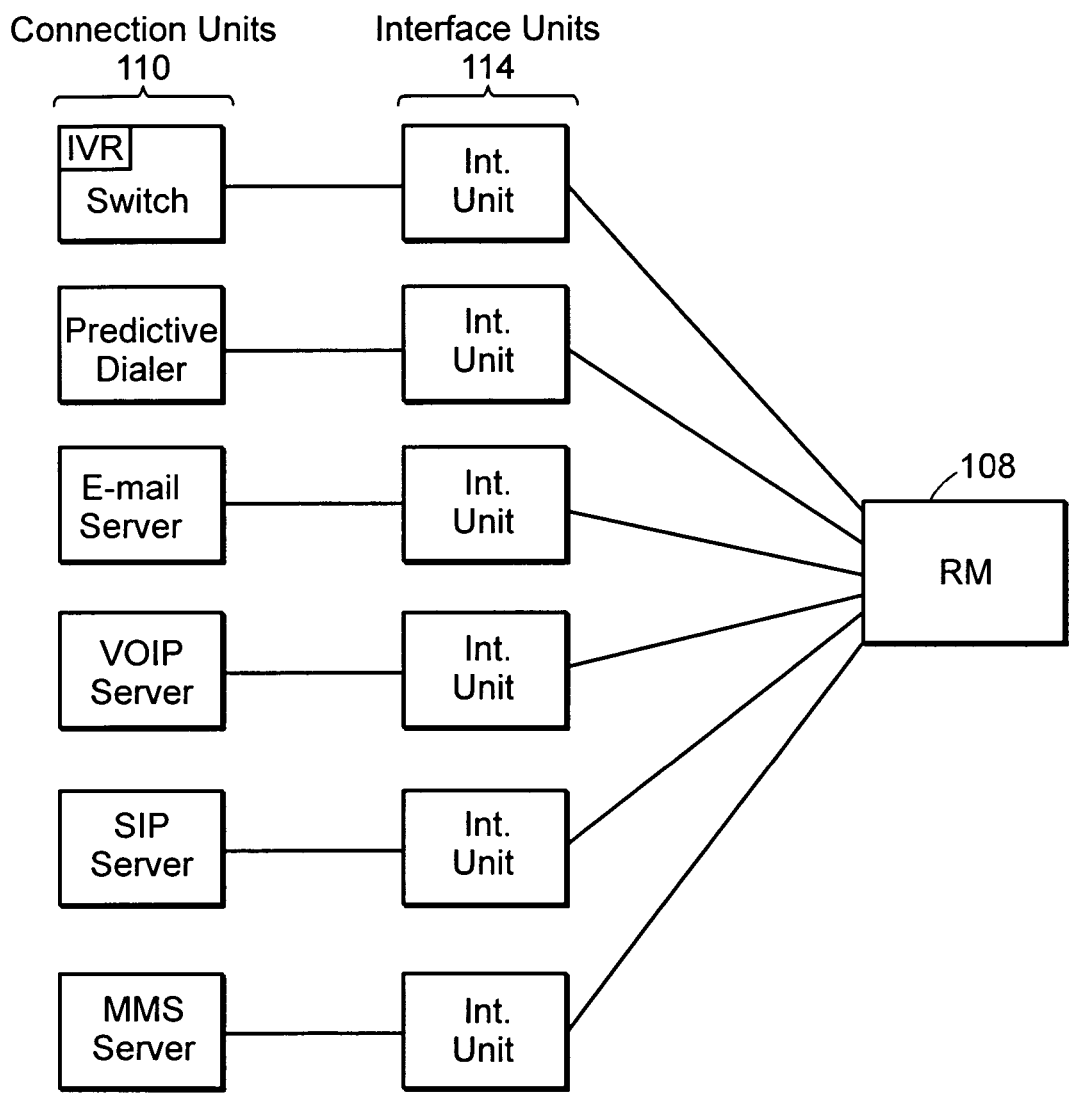
FIG. 5 is a block diagram of multiple interface units interfacing with a relationship management system.

FIG. 4, like FIG. 2, illustrates that one interface unit 110 that may interface with multiple connection units 114 simultaneously. Alternatively, as shown in FIG. 5, each connection unit 110 may interface with a corresponding interface unit 114. In fact, the functionality of connection unit 110 and interface unit 114 may be combined into one unit. For example, an electronic mail server, acting as a connection unit 110, may include an interface unit 114 application to facilitate communications with an RM 108.

Figure 6:
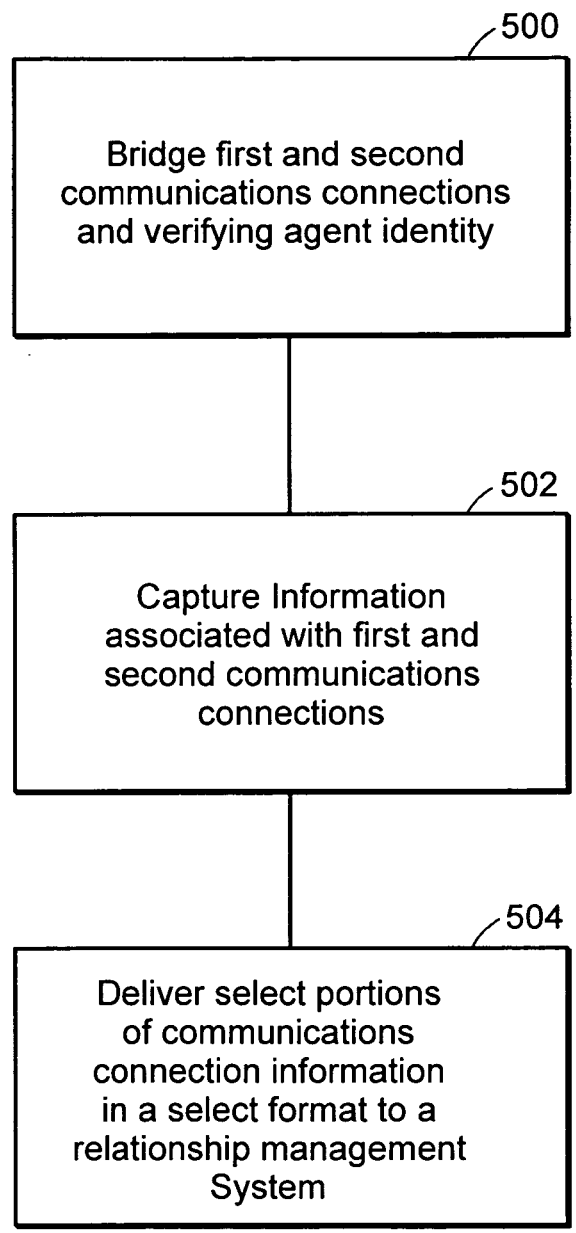
FIG. 6 is a flow chart of a procedure for exchanging information with a relationship management system.

According to the foregoing, the present approach provides a method for exchanging information with a relationship management system. As shown in FIG. 6, the method includes bridging first and second communications connections where the first communications connection is with an origin 104 and the origin 104 is associated with a client agent. Also, the agent's identity may be verified by the connection unit 110 (Step 500). Furthermore, the second communications connection is typically with a destination 106 where destination 106 is associated with a contact. The method further includes capturing information associated with the first and second communications connections (Step 502) and delivering select portions of the communications connection information in a select format to a RM 108 (Step 504).

For example, a client sales agent may attempt to sell one of the client's products to a new customer. To reach the customer contact, the agent may use origin 104-1, e.g., a telephone, and call the "1-800" telephone number associated with IVR 112 within connection unit 110-1. Once the connection is established between connection unit 110-1 using IVR 112 and origin 104-1, the agent may be prompted to enter a pin number or password. If the pin number or password is verified, IVR 112 may then prompt the agent for a destination telephone number of a destination 106 such as destination 106-1 that is associated with the customer contact.

Connection unit 110-1 then initiates a call to destination 106-1 using the destination telephone number by bridging the connections with origin 104-1 and 106-1 to establish a communications connection between them.

Connection unit 110-1 may also forward certain signaling information such as the dialed digits to control unit 116 or interface unit 114-1 so that a reverse look-up of the called telephone number may be performed at database 118-1 allowing the associated contact name, contact address, or any other relevant information to be delivered to interface unit 114-1. At any time before, during, or after the connection is established between connection unit 110-1 and destination 106-1, the agent may explicitly enter designated commands to possibly describe the nature of the call, status of the contact, or other information required by the client's RM system. The contact, under certain conditions, may also have the ability to enter commands or input via the communications connection between connection unit 110-1 and destination 106-1. For instance, the customer contact could be prompted to rate the performance of the agent on scale of 1 through 5 by pressing the 1, 2, 3, 4, or 5 key on the destination 106-1 keypad. This capability requires connection unit 110-1 to include a DTMF detector or the like on the communications connection between connection unit 110-1 and destination 106-1.

Connection unit 110-1 may either immediately forward communications connection information to interface unit 114-1 or forward the information upon completion of a call to destination 106-1. Interface unit 114-1, upon receipt of the information captured from the communications connections with origin 104-1 and 106-1 may send the captured information to RM 108-1 in the form of a data string according to FIG. 3. Interface unit 114-1 may be configured to send certain captured information immediately, i.e., in real-time or near real-time, or as a periodic batch process.

Thus, if the sales agent is successful in selling a certain product to the contact, he may, upon disconnect of the communications connection with destination 106-1, enter the command "#9" to indicate to the RM system that the contact is now an "existing customer." The sales agent may also enter the command "#1" to indicate a successful sale. The sales agent may further enter the command "#2" to indicate that the customer was interested in another product. The meaning of each command and amount of available explicit commands may likely vary depending on the information needed by that particular client's RM system. Furthermore, the commands may be entered in other forms such a voice commands or as text commands for an origin 104 that is capable of supporting those modes of user agent input.

It is also important to note that an agent may maintain the same communications connection between the origin 104-1 and connection unit 110-1 while connection unit 110-1 continuously establishes and disconnects communications connections with new destinations 106 as the agent continuously attempts to make a sale to new contacts.

Instead of simply receiving information, RM 108-1 may also push information to interface unit 114-1, control unit 116, database 118-1, or origin 104-1 depending on the capabilities of the origin 104. Such information could be related to the particular communications connection with destination 106-1 or the information may be specific only to the sale agent. For instance, after a particular agent makes a specified number of calls to contacts, RM 108-1 could send a message to origin 108-1 to indicate the amount of call left for the sale agent to reach their calling quota for a particular period of time. RM 108-1 may also send updated contact address information to database 108-1.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

For example, in the foregoing description of the invention and various embodiments thereof, the term "communications connection" is intended to include circuit-switched communications, packet-switched communications, communications using connectionless protocols such as IP, virtual circuit, or other electronic communications between an origin and destination.

What is claimed is:

1. A system for exchanging information with a relationship management system, the system comprising:
    a connection unit that bridges first and second communications connections to establish a communications connection between an origin and a destination, the first communications connection with the origin, the origin associated with a client agent, an identity of the client agent being verified by the connection unit, the second communications connection with the destination, the destination associated with a contact, the connection unit further capturing client agent information and contact information derived from the first and second communications connections between the client agent and the contact; and
    an interface unit that receives the captured client agent information and contact information from the connection unit and delivers select portions of the captured client agent information and contact information in a select format to a relationship management system.

2. The system according to claim 1 wherein the origin and destination are each a communications device, the communications device being any one of a telephone, a cellular telephone, a personal digital assistance, a pager, a computer, a client interface, a fax device, and a remote computer terminal.

3. The system according to claim 1 wherein the connection unit is any one of a telecommunications switch, an Interactive Voice Response application, a predictive dialer server, a distributed predictive dialer system, an electronic mail server, an Instant Messaging server, a Session Initiated Protocol server, a voice-over-IP server, a Short Message server, and a Multimedia Messaging server.

4. The system according to claim 1 wherein the captured client agent information and contact information includes any one or combination of an origin identifier, a destination identifier, an agent identifier, a contact identifier, an agent name, an agent address, a contact name, a contact address, a contact duration, at least one agent command, at least one contact command, and a contact status.

5. The system according to claim 4 wherein a portion of the captured information is selected to be delivered to the relationship management system based on client-specific preferences.

6. The system according to claim 4 wherein the connection unit captures the client agent information and contact information at any one or combination of the time before the communications are established with the destination, during established communications with the destination, and after communications have ended with the destination.

7. The system according to claim 4 wherein the commands are any one of or combination of dialed digits, pointer clicks, and voice commands.

8. The system according to claim 7 wherein the connection unit includes a DTMF detector that captures the dialed digits.

9. The system according to claim 4 wherein the identifiers are a device address including any one or combination of a telephone number, Internet Protocol address, and an electronic mail address.

10. The system according to claim 4 wherein the identifiers are any one or combination of a name, a username, an agent identification, an office identification number, and identification number.

11. The system according to claim 1 wherein the interface unit formats the captured client agent information and contact information into a data string message, a structured message format, or a binary message for delivery to the relationship management system.

12. The system according to claim 1 wherein the interface unit delivers the select client agent information and contact information in a network message to the relationship management system, the interface unit accessing a web queue service to schedule the message delivery over an IP network, the relationship management system accessing a listener unit to receive the message.

13. The system according to claim 12 wherein the listener unit monitors an IP network and captures the client agent information and contact information sent directly or indirectly from the connection unit, the listener unit further converting the client agent information and contact information into a format required by the relationship management system.

14. The system according to claim 1 wherein the interface unit is capable of delivering the select client agent information and contact information to multiple relationship management systems, the delivered client agent information and contact information being selected for each relationship management system.

15. The system according to claim 14 wherein each relationship management system is associated with a distinct client or a distinct group of clients.

16. The system according to claim 1 wherein the relationship management system is any one of a premise-based and remotely hosted relationship management system.

17. The system according to claim 1 wherein the relationship management system has one or more remote interfaces that enable one or more members of the client's organization to view or modify select information within the relationship management system.

18. The system according to claim 17 wherein the origin includes a remote interface to the relationship management system.

19. The system according to claim 1 wherein the client agent is any one of a sales, customer service, marketing, public service representative, service collections, and member of a client's organization.

20. The system according to claim 1 wherein the relationship management system is a customer relationship system.

21. The system according to claim 1 wherein the client agent information and contact information is delivered in real-time or near real-time to the relationship management system.

22. The system according to claim 1 wherein the interface unit is capable of querying an identifier reverse look-up table or other networked systems to retrieve name, address, or any other relevant information associated with the identity of a communications device.

23. The system according to claim 1 wherein the interface unit is capable of receiving information from the relationship management system to configure the interface unit and any other system connected to the interface unit.

24. The system according to claim 1 wherein the contact is any one or combination of a prospective customer, a customer, an entity related to the client agent, an entity to which the client agent has an obligation, and a person.

25. A method for exchanging information with a relationship management system, the method comprising:
bridging first and second communications connections to establish a communications connection between an origin and a destination, the first communications connection with the origin and a connection unit, the origin associated with a client agent, an identity of the client agent being verified by the connection unit, the second communications connection with the destination and the connection unit, the destination associated with a contact;
capturing client agent information and contact information derived from the first and second communications connections between the client agent and the contact; and
delivering select portions of the captured client agent information and contact information in a select format to a relationship management system.

26. The method according to claim 25 wherein the origin and destination are each a communications device, the communications device being any one of a telephone, a cellular telephone, a personal digital assistance, a pager, a computer, a client interface, and a remote computer terminal.

27. The method according to claim 25 wherein the bridging and capturing are performed by the connection unit, the connection unit being any one of a telecommunications switch, an Interactive Voice Response application, a predictive dialer server, a distributed predictive dialer system, an electronic mail server, an Instant Messaging server, a Session Initiated Protocol server, a voice-over-IP server, a Short Message server, and a Multimedia Messaging server.

28. The method according to claim 25 wherein the captured client agent information and contact information includes any one or combination of an origin identifier, a destination identifier, an agent identifier, a contact identifier, an agent name, an agent address, a contact name, a contact address, a contact duration, at least one agent command, at least one contact command, and a contact status.

29. The method according to claim 28 wherein a portion of the captured information is selected to be delivered to the relationship management system based on client-specific preferences.

30. The method according to claim 28 wherein the client agent information and contact information is captured at any one or combination of the time before the communications are established with the destination, during established communications with the destination, and after communications have ended with the destination.

31. The method according to claim 28 wherein the commands are any one of or combination of dialed digits, pointer clicks, and voice commands.

32. The method according to claim 31 wherein a DTMF detector captures the dialed digits.

33. The method according to claim 28 wherein the identifiers are a device address including any one or combination of a telephone number, Internet Protocol address, and an electronic mail address.

34. The method according to claim 28 wherein the identifiers are any one or combination of a name, a username, an agent identification, an office identification number, and an identification number.

35. The method according to claim 25 wherein an interface unit formats the captured client agent information and contact information into a data string message, a structured message format, or a binary message for delivery to the relationship management system.

36. The method according to claim 25 wherein delivering of the select client agent information and contact information is performed by an interface unit that sends a network message to the relationship management system, the interface unit accessing a web queue service to schedule the message delivery over an IP network, the relationship management system accessing a listener unit to receive the message.

37. The method according to claim 36 wherein the listener unit monitors an IP network and captures the client agent information and contact information delivered directly or indirectly, the listener unit further converting the client agent information and contact information into a format required by the relationship management system.

38. The method according to claim 25 wherein the select client agent information and contact information is delivered to multiple relationship management systems, the delivered client agent information and contact information being selected for each relationship management system.

39. The method according to claim 38 wherein each relationship management system is associated with a distinct client or a distinct group of clients.

40. The method according to claim 25 wherein the relationship management system is any one of a premise-based and remotely hosted relationship management system.

41. The method according to claim 25 wherein the relationship management system has one or more remote interfaces that enable one or more members of the client's organization to view or modify select information within the relationship management system.

42. The method according to claim 41 wherein the origin includes a remote interface to the relationship management system.

43. The method according to claim 25 wherein the client agent is any one of a sales, customer service, marketing, public service representative, collections management, and member of a client's organization.

44. The method according to claim 25 wherein the relationship management system is a customer relationship system.

45. The method according to claim 25 wherein the client agent information and contact information is delivered in real-time or near real-time to the relationship management system.

46. The method according to claim 25 further comprising querying an identifier reverse look-up table or other networked systems to retrieve name, address or any other relevant information associated with the identities of the origin and destination 47. The method according to claim 25 further comprising receiving information from the relationship management system.

48. The method according to claim 25 wherein the contact is any one or combination of a prospective customer, a customer, an entity related to the client, an entity to which the client has an obligation, and a person.

49. A system for exchanging information with a relationship management system, the system comprising:
 means for bridging first and second communications connections to establish a communications connection between an origin and a destination, the first communications connection with the origin, the origin associated with a client agent, an identity of the client agent being verified by a connection unit, the second communications connection with the destination, the destination associated with a contact;
 means for capturing client agent information and contact information derived from the first and second communications connections between the agent and the contact; and
 means for delivering select portions of the captured client agent information and contact information in a select format to a relationship management system.

50. A non-transitory computer program product comprising a computer readable medium having a computer readable program, wherein the computer readable program when executed on a computer causes the computer to:
 bridge first and second communications connections to establish a communications connection between an origin and a destination, the first communications connection with the origin, the origin associated with a client agent, an identity of the client agent being verified by a connection unit, the second communications connection with the destination, the destination associated with a contact;
 capture client agent information and contact information associated with the first and second communications connections between the client agent and the contact; and
 deliver select portions of the captured client agent information and contact information in a select format to a relationship management system.

* * * * *